United States Patent [19]

Rocroi et al.

[11] Patent Number: 4,535,293

[45] Date of Patent: Aug. 13, 1985

[54] METHOD FOR GEOPHYSICAL PROSPECTING USING IMPULSINE CURRENTS

[75] Inventors: Jean-Pierre C. Rocroi, Massy; Francois V. Gole, Meudon, both of France

[73] Assignee: Compagnie Generale de Geophysique, Massy, France

[21] Appl. No.: 526,727

[22] Filed: Aug. 26, 1983

Related U.S. Application Data

[62] Division of Ser. No. 166,893, Jul. 8, 1980, Pat. No. 4,417,210.

[30] Foreign Application Priority Data

Jul. 9, 1979 [FR] France ................................. 79 17766
Feb. 13, 1980 [FR] France ................................. 80 03159

[51] Int. Cl.$^3$ ........................... G01V 3/02; G01V 3/08
[52] U.S. Cl. ..................................... 324/336; 324/102; 324/360
[58] Field of Search ............... 324/336, 357, 360, 362, 324/77 A, 102, 77 R, 350; 328/151, 165, 167; 367/38, 43–47

[56] References Cited

U.S. PATENT DOCUMENTS

| | | | |
|---|---|---|---|
| 2,234,956 | 3/1941 | Bilinsky | 324/360 |
| 3,382,428 | 5/1968 | Sherwood et al. | 324/357 |
| 3,518,414 | 6/1970 | Goodman et al. | 367/43 X |
| 3,538,430 | 11/1970 | Bulgakov et al. | 324/336 |
| 3,737,768 | 6/1973 | Lazenby et al. | 324/336 |
| 3,795,861 | 4/1974 | Lazenby et al. | 324/336 X |
| 3,858,168 | 12/1974 | Barr et al. | 367/43 |
| 3,984,759 | 10/1976 | St-Amant et al. | 324/362 |
| 3,986,207 | 10/1976 | Gerbel et al. | 324/350 X |
| 4,449,099 | 5/1984 | Hoehn | 324/77 R X |

Primary Examiner—Gerard R. Strecker
Attorney, Agent, or Firm—Schwartz, Jeffery, Schwaab, Mack, Blumenthal & Evans

[57] ABSTRACT

In a method of geophysical prospection a transmitter dipole and a receiver dipole which is sensitive to an electromagnetic field are positioned in cooperation with the subsoil. An impulsive excitation current is applied repeatedly to the transmitter dipole, the excitation current comprising a group of pulses of alternate polarity, each followed by zero current. The transient signal, which is produced thereby at the output of the receiver dipole, is repeatedly detected, and the transient signals are processed to obtain a figurative representation of the transient phenomenon which facilitates geophysical interpretation. Time intervals which are consecutive to excitation pulses and simultaneously with the excitation zero current are defined, these time intervals being of a predetermined duration, chosen to substantially cover all the useful parts of the transient phenomenon. The transient signal is detected as a function of time at least during the time intervals and is sampled, numbered and registered, temporally marked. As used herein, "numbered" may be taken to mean digitalized and "registered" may be taken to mean recorded or memorized. A processing operation is carried out which commences with a preprocessing in which an unprocessed numerical representation of the transient phenomenon as a function of time is subjected to statistical evaluation of samples or elements of the numerical registration or digital record which correspond temporally to the successive time intervals, followed by a smoothing digital filtering which provides a smoothed numerical or digital representation of the transient phenomenon, cleared of a substantial part of the surrounding noise.

26 Claims, 27 Drawing Figures

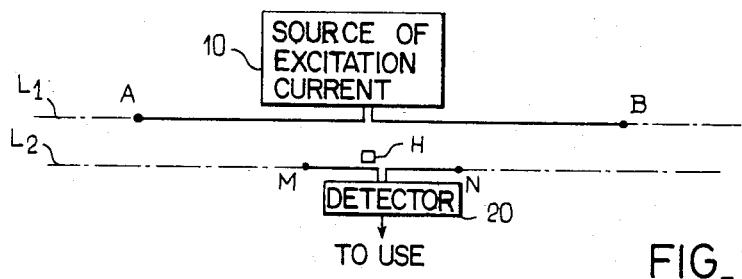
FIG_1 PRIOR ART
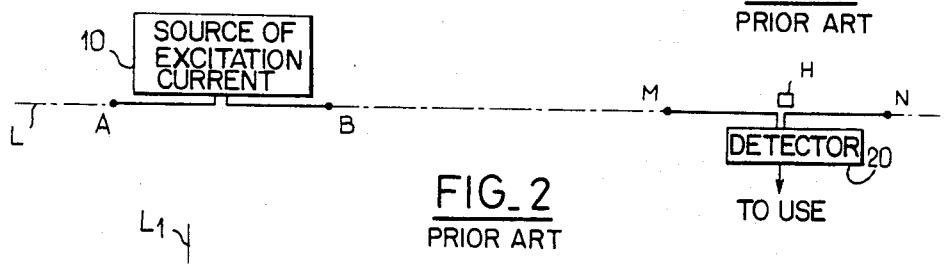
FIG_2 PRIOR ART
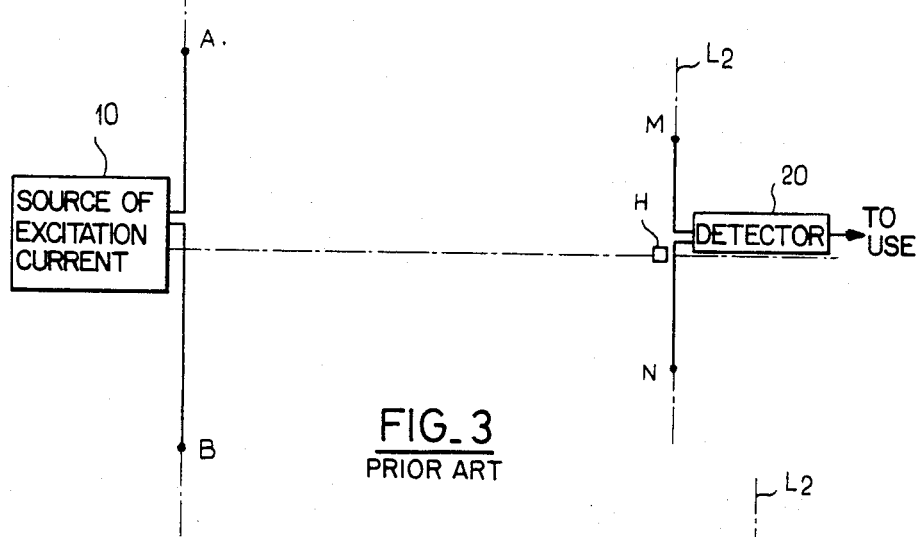
FIG_3 PRIOR ART
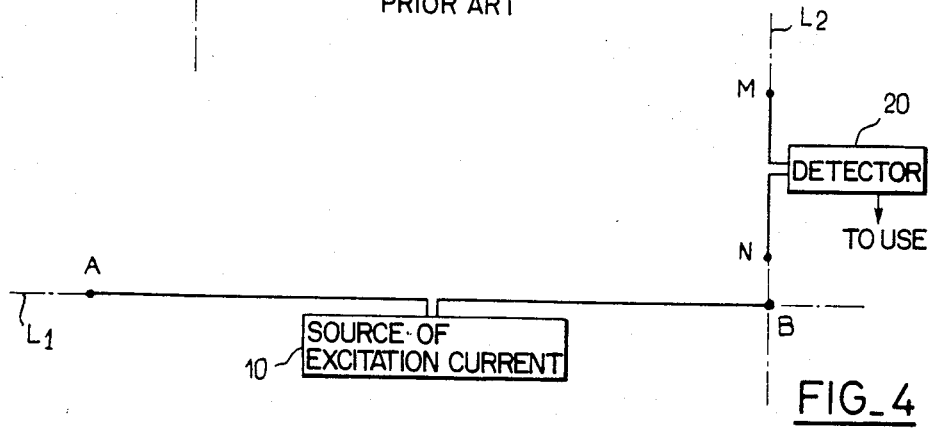
FIG_4 PRIOR ART

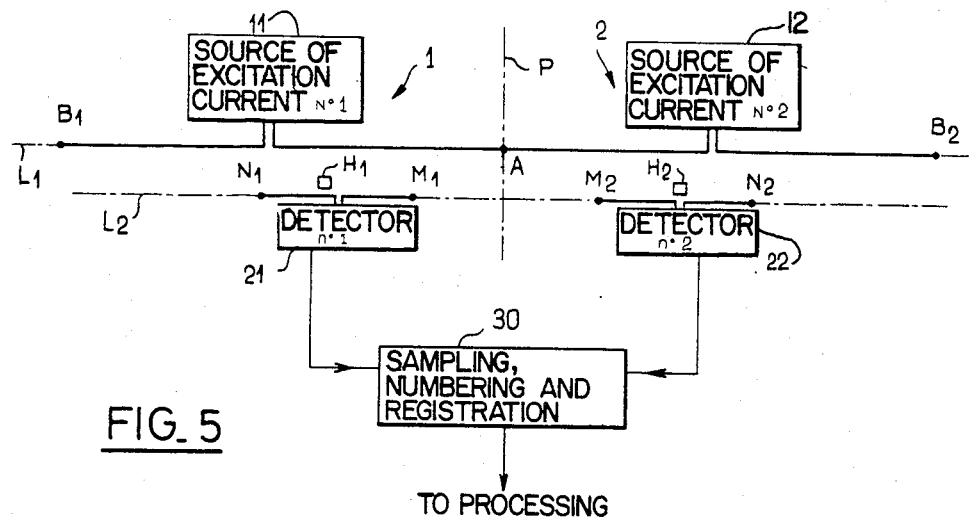
FIG_5
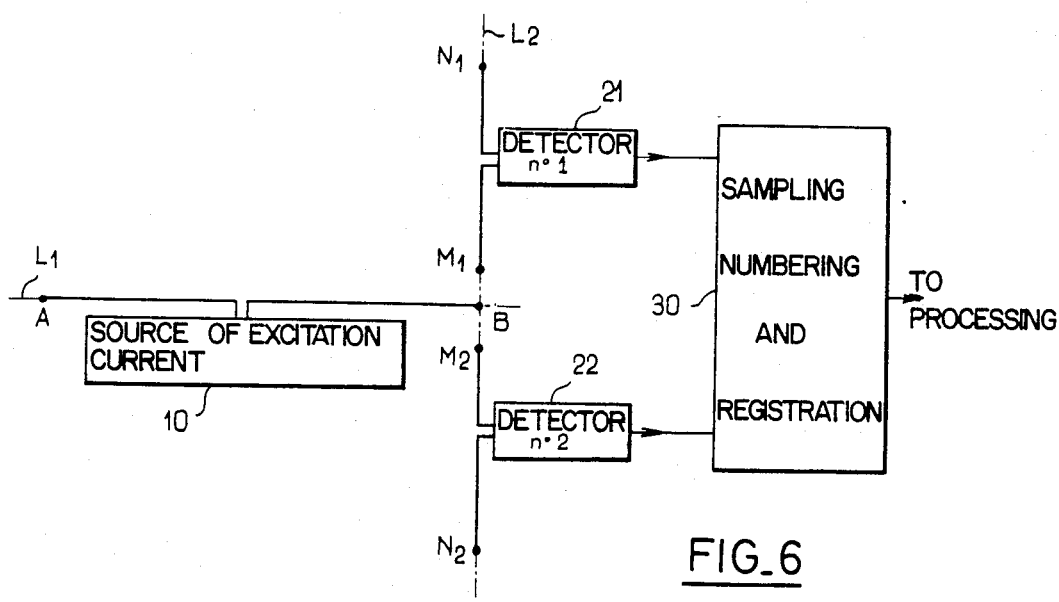
FIG_6
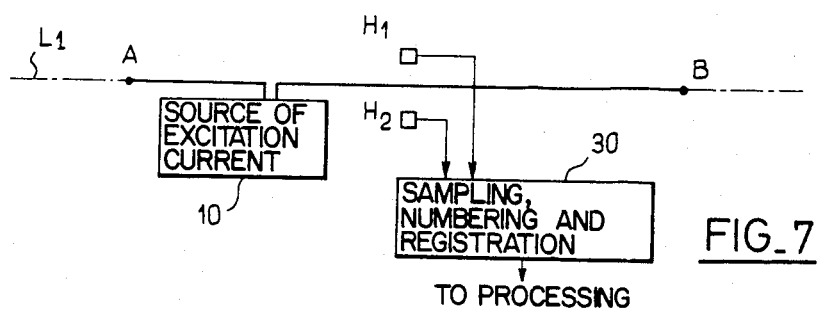
FIG_7

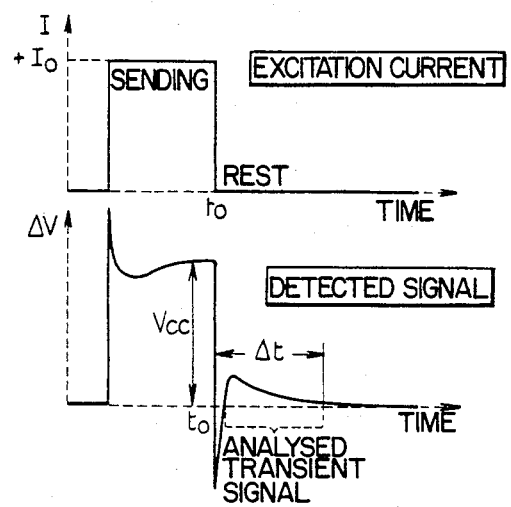
FIG_8A
FIG_8B
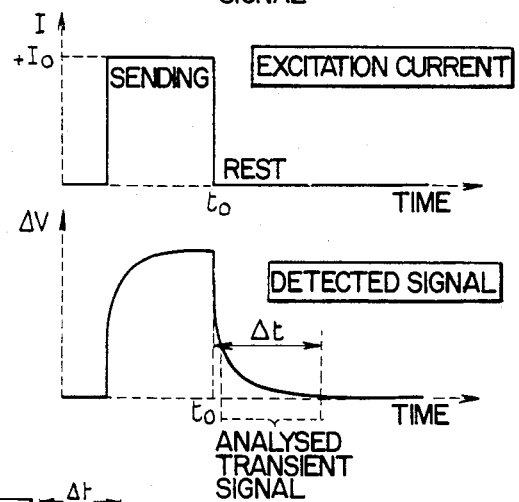
FIG_9A
FIG_9B
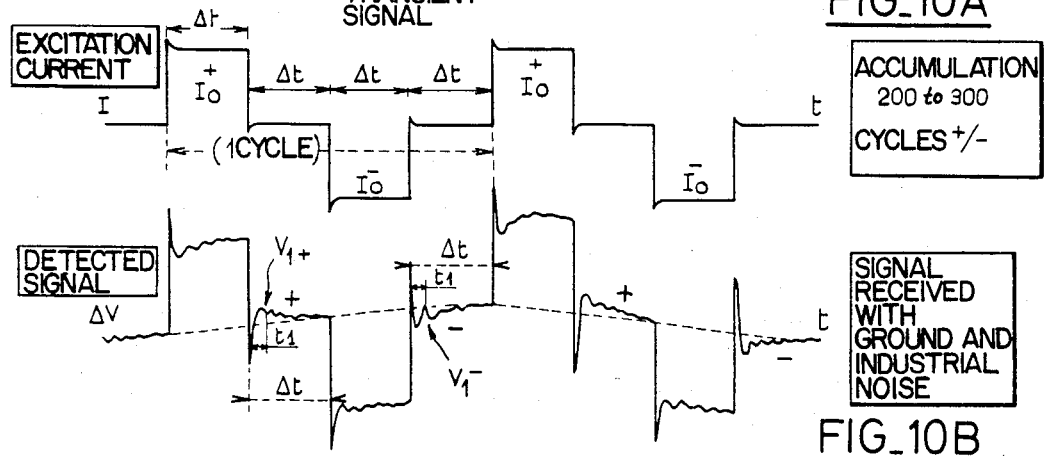
FIG_10A
FIG_10B

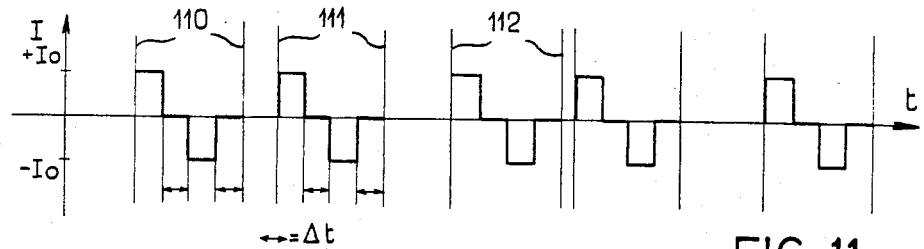
FIG_11
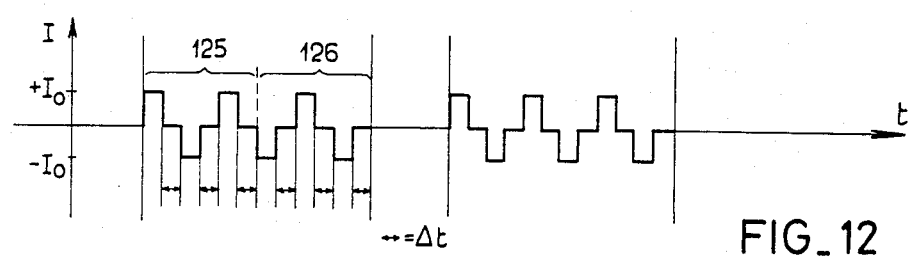
FIG_12
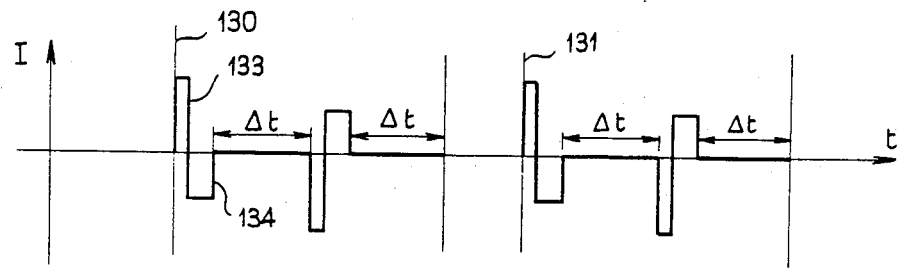
FIG_13
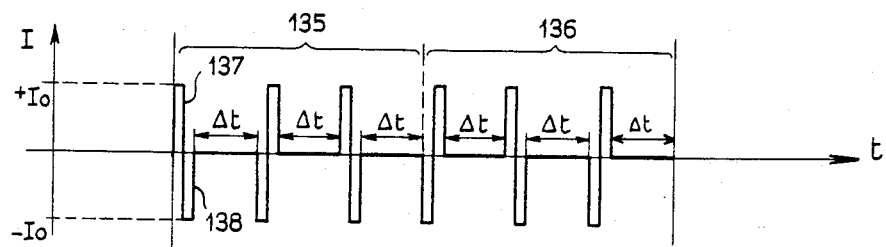
FIG_14

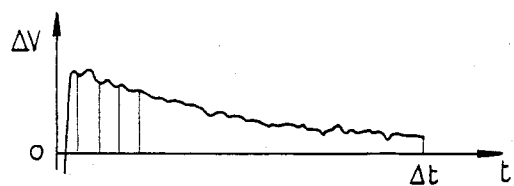
FIG_15
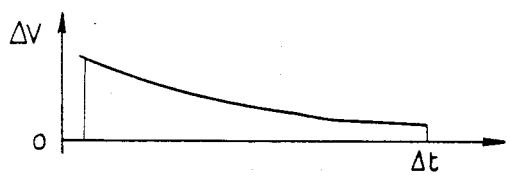
FIG_16
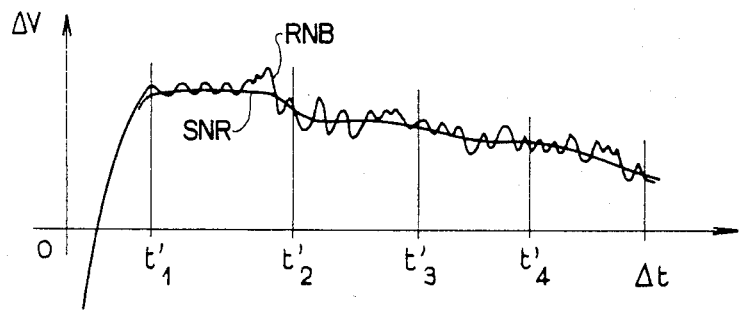
FIG_17

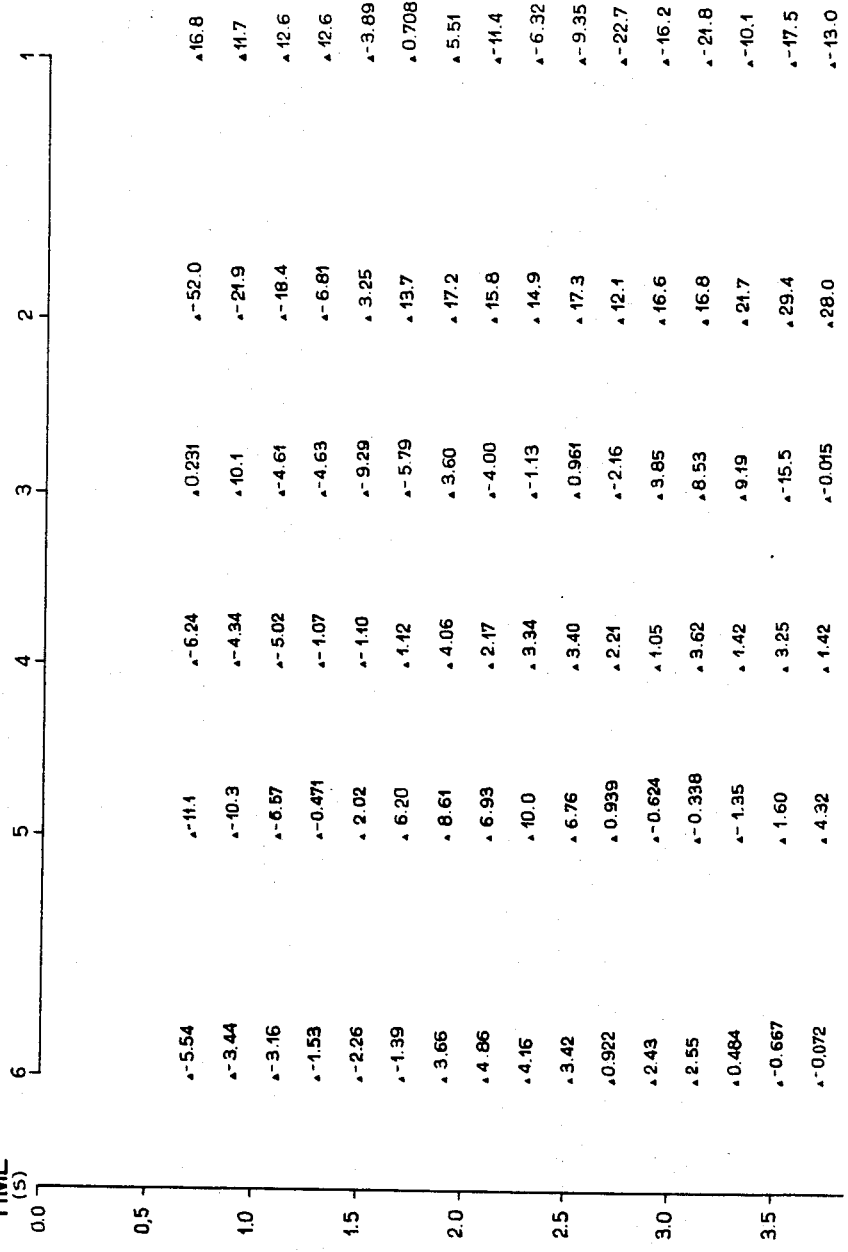
FIG_18

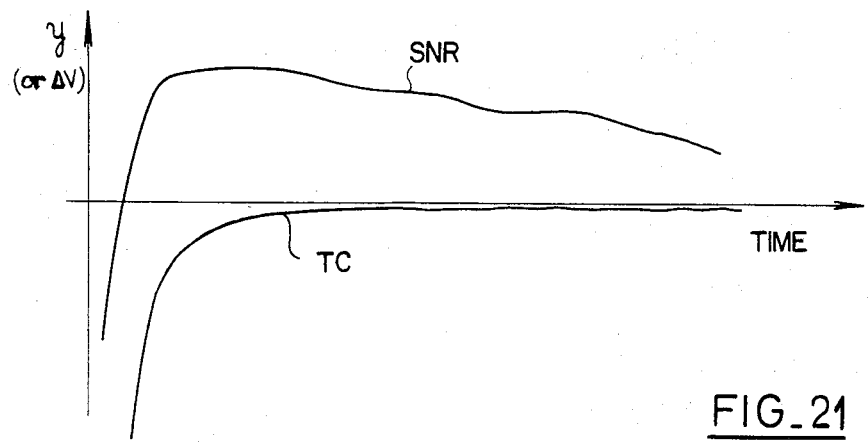
FIG._21
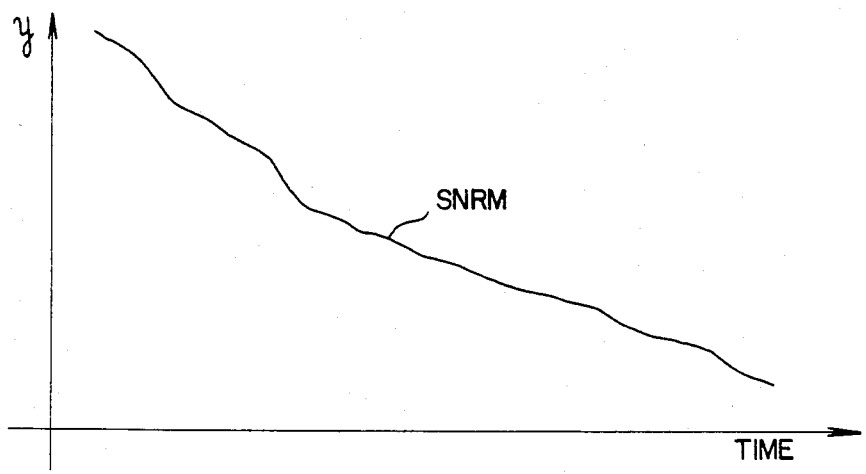
FIG._22

METHOD FOR GEOPHYSICAL PROSPECTING USING IMPULSINE CURRENTS

This is a division of application Ser. No. 166,893, filed July 8, 1980 now U.S. Pat. No. 4,417,210.

FIELD OF THE INVENTION

The present invention relates to a method of geophysical prospection using by transient currents.

BACKGROUND OF THE INVENTION

In the above mentioned method, a transmitter dipole and a receiver dipole, sensitive to an electromagnetic field are initially arranged in co-operation with the subsoil. An impulsive exciting current is then applied repeatedly to the transmitter dipole in order to define pulses of alternate polarity, each one being followed by zero current. The transient signal which is produced thereby is repeatedly detected at the output of the receiver dipole. A subsequent processing of the transient signals which are detected successively allows a figurative representation of the transient phenomenon to be obtained which facilitates interpretation by the geophysicist. In fact, it is only possible for the analysis to be effected by man in this method, as at present there is no theory or model which allows the direct exploitation of detected signals.

A characteristic of transient currents is that they have a very low amplitude, and are often disturbed by noises from various sources, notably noises from industry and from the ground. The presence of noise means that the geophysicist is often confronted with serious problems in interpretating the data and documents which he is given after processing.

SUMMARY OF THE INVENTION

The principle object of the present invention is to improve this situation, particularly by reducing the noise level.

According to the invention there is provided a method of geophysical prospection in which a transmitter dipole and receiver dipole which is sensitive to an electromagnetic field are positioned in cooperation with the subsoil, an impulsive excitation current is applied repeatedly to the transmitter dipole, the excitation current comprising a group of pulses of alternate polarity, each followed by zero current, and the transient signal, which is produced thereby at the output of the receiver dipole, is repeatedly detected, followed by processing of the transient signals which are detected successively in order to obtain a figurative representation of the transient phenomenon which facilitates geophysical interpretation, wherein time intervals which are respectively consecutive to excitation pulses and contemporary with the excitation zero current are defined, these time intervals being of a predetermined duration, chosen to substantially cover all the useful part of the transient phenomenon, the transient signal is detected as a function of time at least during the time intervals and is sampled, numbered (or digitalized) and registered (or recorded), temporally marked, and a processing operation is carried out which commences with a preprocessing in which an unprocessed numerical representation (or digital record) of the transient phenomenon as a function of time is subjected to statistical evaluation of elements (or samples) of the numerical registration which correspond temporally in the successive time intervals, followed by a smoothing digital filtering which provides a smoothed numerical representation of the transient phenomenon, cleared of a substantial part of the surrounding noise.

According to a preferential aspect of the invention, the transmission signal is repeated a great number of times, preferably several hundred times. At present it is also preferred to continuously register the excitation current as well as the detected signal in a numerical form, even during the pulses. The predetermined duration of the detection time intervals is chosen to be approximately between 1 and 20 seconds, according to the characteristics of the transmission current (notably energy and duration of the pulses). The sampling step is advantageously between two and fifty milliseconds.

The excitation current or transmission current is advantageously repeated in a random manner; this is tracked in order to determine the unprocessed numerical representation. Here, the random character is to be understood bearing in mind the number of repetitions which are provided. It signifies that no periodicity or practically no periodicity appears in the several hundred repetitions of the transmission current. The transmission current may comprise several groups, preferably triplets of pulses of alternate polarity, in which case the random character is applied, if necessary, to these groups together.

According to another very advantageous embodiment, within each group of excitation pulses the first pulse comprises two intervals of current of opposed polarity, being substantially adjacent to each other, of zero net energy, and lasting for a short time in relation to the duration of the time interval of zero current which follows it. The other pulses of the group have the same form as the first, but with a reversed polarity each time.

Other characteristics of the invention relate to ground devices which allow noise to be reduced by arranging the dipoles in a particular manner. These preferred devices for the ground have in common the fact that the transmitter dipole is an electrical dipole, comprising two electrodes which are spaced apart and between which the transmission current is applied. These two electrodes define a transmission axis.

In a first ground device, the receiver dipole is another electrical dipole positioned on a reception axis parallel to the transmission axis, next to the transmitter dipole and shorter than this dipole. According to the invention, a second electrical transmitter dipole which is as long as the first transmitter dipole is positioned on the transmission axis in a substantially adjacent position to the first transmitter dipole. Therefore, the two transmitter dipoles are symmetrical to each other in relation to one axis, perpendicular to the transmission axis. Excitation currents which are substantially equal and of opposed polarity are simultaneously applied to the two transmitter dipoles. A second electrical receiver dipole which is symmetrical to the first receiver dipole in relation to the said axis of symmetry is positioned on the reception axis. Signals appearing at the terminals of the two receiver dipoles are simultaneously detected. The addition at each instant of the two detected signals with opposed polarities allows the effect of the electrical surrounding noises on the useful transient signals to be substantially reduced. In this case, at least one magnetic dipole is advantageously positioned next to each of the electrical receiver dipoles. These magnetic dipoles are also symmetrical in relation to the said axis of symmetry.

In a second ground device, the receiver dipole is another shorter electrical dipole with its axis perpendicular to that of the transmitter dipole, and the intersection of the axes of the two dipoles is next to an end of the transmitter dipole. According to the invention, a second electrical receiver dipole is positioned symmetrically to the first receiver dipole in relation to the axis of the transmitter dipole, and the signals appearing at the terminals of the two receiver dipoles are simultaneously detected. The addition at each instant of the two detected signals with opposed polarities allows the effect of the electrical surrounding noises on the useful transient signals to be substantially reduced.

In a third ground device, the receiver device comprises a magnetic dipole next to the electrical transmitter dipole, between its ends. According to the invention a second magnetic dipole is positioned symmetrically to the first in relation to the axis of the transmitter dipole, and the signals appearing at the terminals of the two magnetic dipoles are simultaneously detected. The addition at each instant of the two detected signals with opposed polarities allows the effect of the electrical surrounding noises on the useful transient signals to be substantially reduced.

It will be recalled that the preliminary processing comprises the statistical accumulation as a function of time of the numerical transient signals which are successively received during the previously mentioned time intervals, following each excitation pulse. In the case of the ground devices which produce two simultaneously detected signals, the addition of the two signals may either be effected on the ground, being registered separately in addition to the two detected signals, or subsequently, within the context of the preliminary processing or the processing.

From what has been mentioned above, it will be understood that the measurements made at different stations are processed to produce a figurative representation of the results, attributed to the geographical situation of the stations. The geophysicist investigates this. From the signals come measurements, "anomalies" which he considers to correspond to his objectives. The typical figure of the results which is obtained is a number of anomalies represented in the form of time sections or charts (residual anomalies of the signal of detected transient).

A preferred embodiment of the invention improves the representation of the anomalies and provides a better arranged configuration, which the geophysicist immediately compares to a subsoil structure, for example, such as is obtained in prospection of the seismic reflection type.

The preferred embodiment is concerned with the variations in the gradient of the detected transient as a function of time, for each prospection station. By designating this detected transient by a function of time y (t), its time derivative $$y'_i(t) = \frac{dy(t)}{dt}$$

is presently preferred to be determined, or rather the reciprocal of its logarithmatic derivative $y/y'_t$. In the following, these will be referred to as indicator functions, with the observation that in the case of the logarithmic derivative, the indicator function practically represents, as a function of time, the exponential time constants which best approach the detected transient.

We have observed that these indicator functions I (t) are affected for each station by a kind of drift, which to say that they vary as a function of time, and that this drift is fairly similar for all the stations of a studied geological section, or part of a section.

Therefore, according to the preferred embodiment, a "regional" indicator is investigated which represents the drift common to several stations. This drift or regional indicator is substracted from the local indicator functions which relate to each of the stations individually. The "residual" indicators which are thus obtained are therefore the subject of the final figurative representation intended for the geophysicist.

It has been established that by applying this method to a number of stations which are substantially aligned and by constructing a time section (a space coordinate, taken on the line of the stations, and the time coordinate of the transient phenomenon), a representation can be obtained which represents a structure resembling the structure of the subsoil, such as is provided by geophysical prospection using seismic reflection.

In this manner, it has proved to be desirable for the detected transient to be represented using a time scale in the form of the square root of t, in order to be able to be directly comparable to the representation in the scale of linear time of seismic reflection.

The invention also suggests different modes of effecting the operations of preliminary processing and also of processing, and also means for implementing the method on the ground.

These characteristics of the invention as well as other characteristics and advantages which are provided will become apparent when reading the detailed description which follows, with reference to the accompanying drawings which have merely been given by way of non-limiting illustration.

BRIEF DESCRIPTION OF THE DRAWINGS

FIGS. 1 to 4 schematically show four transmitter-receiver devices of the known type;

FIGS. 5 to 7 schematically show three transmitter-receiver devices which the invention may preferably use;

FIGS. 8A, 8B and 9A, 9B respectively show two types of detected transient of the subsoil to an excitation current with an interval;

FIGS. 10A and 10B respectively show an embodiment of an excitation current repeated a great many times, and the corresponding detected signal;

FIG. 11 shows an embodiment of an excitation current, at random repetition, where the basic cycle comprises two pulses of constant current, with alternate polarity;

FIG. 12 shows an embodiment of an excitation current at random repetition, where the basic cycle comprises pulse triplets of constant current, with alternate polarity;

FIGS. 13 and 14 show excitation currents with cycles similar to the cycles of FIGS. 11 and 12 respectively, but where each pulse comprises a change in polarity which gives it an average value which is substantially zero;

FIG. 15 shows an embodiment of a curve associated with the unprocessed numerical representation FIG. 16 shows an embodiment of a curve associated with the smoothed numerical representation;

FIG. 17 schematically represents the production of a smoothing by cubic curves;

FIG. 18 is a numerical table which shows, with time as the ordinate, the numerical representations obtained after processing for six stations which are substantially aligned, that is section B;

FIG. 21 is a graph showing the standardization stage from the theoretical response of the simplified subsoil for the preferred embodiment of the invention;

FIG. 22 shows the rate of the monotonic representation of the transient response obtained after standardization;

FIG. 25 shows the form of a local indicator obtained as a logarithmic derivative of the curve of FIG. 22, and also a regional indicator.

DETAILED DESCRIPTION OF ILLUSTRATED EMBODIMENTS

Figure 19:
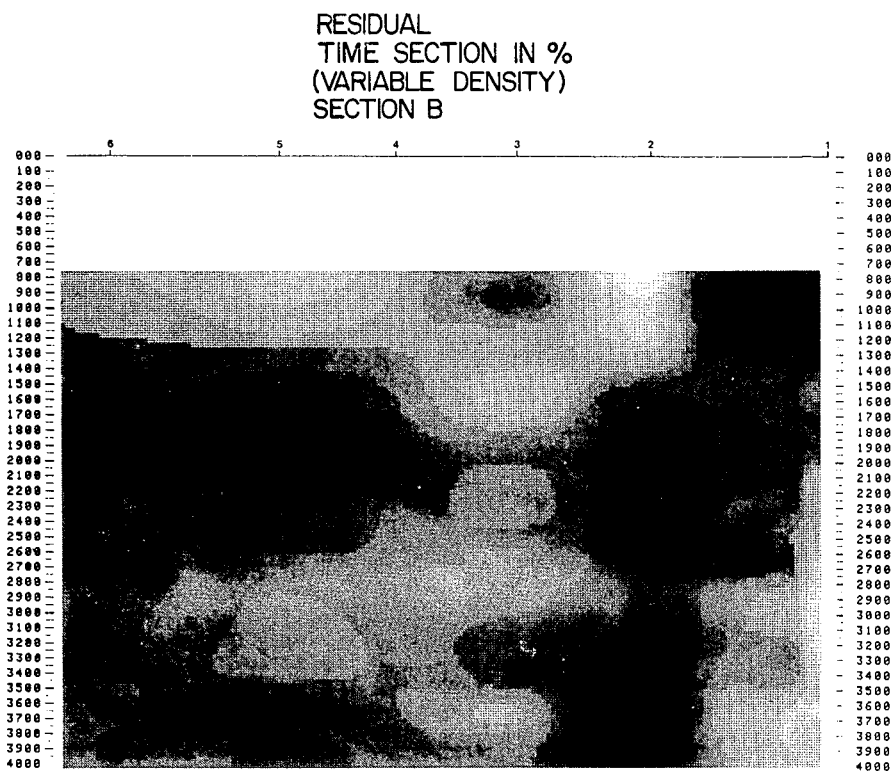
FIG. 19 is a figurative representation in the form of a time section, corresponding to the table of FIG. 18.

In geophysical prospection by transient currents, a transmitter dipole is firstly positioned in cooperation with the subsoil, and also a receiver dipole which is sensitive to an electromagnetic field. The assembly of transmitter-receiver is often called a ground device. For certain uses, the transmitter dipole may be a magnetic dipole. However, generally an electric dipole is preferred for transmission. Thus, FIGS. 1 to 4 show an electrical transmitter dipole A-B. Two electrodes are pushed into the ground at points A and B. Wires exit from these electrodes substantially along the axis A-B, to arrive at two outputs of a source of an excitation current 10. The form of excitation current will be described later on.

The receiver dipole may also be an electrical dipole M-N, with two electrodes pushed into the ground at M and N, and two wires along the axis M-N which lead to a detector member 20. The latter measures the voltage between the points M and N, which represents a component of the electromagnetic field.

Ground Devices

Different embodiments of the electrical transmitter and receiver dipoles are already known. In FIG. 1, the electrical receiver dipole is positioned on a reception axis $L_2$, parallel to axis $L_1$ of the transmitter dipole. The receiver dipole is next to the transmitter dipole and is shorter than it. This configuration is often called a Schlumberger device. The dimensions M-N and A-B are on the order of several hundred meters.

In FIG. 2, the transmitter dipole A-B and the receiver dipole M-N are aligned on the same axis L. This configuration is known by the name of polar dipole-dipole.

In FIG. 3, the arrangement is generally similar to that of FIG. 1, but the receiver dipole M-N is now at some distance from the transmitter dipole A-B. This configuration is known as an equatorial dipole-dipole.

In FIG. 4, the transmitter dipole A-B is positioned on a transmission axis $L_1$, while the receiver dipole M-N is positioned on a reception axis $L_2$ perpendicular to $L_1$ next to one of the ends, B for example, of the transmitter dipole. This configuration is known as a perpendicular dipole-dipole.

With a transmitter dipole of the electrical type, the receiver dipole may be of the magnetic type. Thus, in FIG. 1, a magnetic dipole H is positioned next to the section M-N. This magnetic dipole H may be sensitive to one or more components of the magnetic field. It may either be used instead of the electrical receiver dipole, or in addition to it. There is also a magnetic dipole H substantially in the middle of the section M-N in FIG. 2, as well as in FIG. 3.

The devices of FIGS. 1 to 4 are those which, among others, are used very frequently at present in geophysical prospection by transient currents.

Although the present invention may use known ground devices, it has been found to be preferable at least for certain uses, to use specially designed ground devices. These devices are distinguished by a differential device which allows an addition of the detected signals and a subtraction of the noises.

We have observed that certain ground devices could be doubled and made the subject of a differential assembly in which a substantial reduction in noise is produced. These preferred devices are referred to below as anti-noise devices.

The first anti-noise device, shown in FIG. 5, comprises a doubling of the Schlumberger device of FIG. 1. In more precise terms, a second electrical transmitter dipole $A-B_2$ is positioned on the transmission axis $L_1$. The two transmitter dipoles are of the same length and remain thus symmetrical in relation to the axis P, perpendicular to the axis $L_1$. In the illustrated embodiment, the two dipoles have a common end A. The intermediate axis of symmetry of the other ends $B_1-B_2$ thus passes through this common end A. Two sources 11 and 12 simultaneously apply excitation currents which are substantially equal and of opposed polarity to two transmitter dipoles $A-B_1$ and $A-B_2$ respectively. The opposed polarity signifies here that the current passing in the electrical dipole $A-B_1$ and the current passing in the electrical dipole $A-B_2$ are not from the same direction when passing through the axis $L_1$ in a given direction. In practice, a single source is used which symmetrically powers the two lines $A B_1$ and $A B_2$.

The two electrical receiver dipoles $M_1-N_1$ and $M_2-N_2$ which are symmetrical to each other in relation to the intermediate perpendicular P are positioned on the reception axis $L_2$. The two receiver dipoles are thus equal and it will be noted that the assembly of the dipoles is symmetrical in relation to the common perpendicular P to the transmission and reception axes $L_1$ and $L_2$. Respective members 21 and 22 simultaneously detect the signals appearing at the terminals of the two electrical receiver dipoles $M_1-N_1$ and $M_2-N_2$. With an assembly of this type, the addition at each instant of the two detected signals with opposed polarities allows the effect of the surrounding electrical noises on the useful transient signals to be substantially reduced. In a variation, magnetic dipoles $H_1$ and $H_2$ which are sensitive to one or more components of the magnetic field and are substantially symmetrical in relation to the perpendicular P may either be arranged instead of the electrical receiver dipoles or in addition thereto.

The detectors 21 and 22 are connected to an electronic device 30 for sampling, numbering and registration. The data thus registered may then be submitted to processing in a manner which will be described later on.

If necessary, magnetometers $H_1$ and $H_2$ are also connected to the sampling, numbering and registration device 30. In this case, their connections have not been shown in order to simplify the drawing.

The second anti-noise device, shown in FIG. 6, is comparable in certain respects to the perpendicular dipole-dipole of FIG. 4, except that a second electrical receiver dipole $M_2$-$N_2$ is positioned symmetrically to the first electrical receiver dipole $M_1$-$N_1$ in relation to the axis $L_1$ of the transmitter dipole. As before, the signals appearing at the terminals of the two receiver dipoles are simultaneously detected by means of the detectors 21 and 22. The signals which are thus detected are fed into a sampling, numbering and registration circuit 30. The addition at each instant of the two detected signals with opposed polarities, i.e. symmetrical in relation to the axis $L_1$, allows the effect of the surrounding electrical noises on the useful transient signals to be substantially reduced.

A third anti-noise device is shown in FIG. 7. In this device, the receiver dipoles are of a magnetic type. Two magnetometers $H_1$ and $H_2$ are positioned symmetrically in relation to the electrical transmitter dipole A–B, substantially in its centre and next to it. These magnetometers are sensitive to one or more components of the magnetic field, preferably at least to the vertical magnetic field, as in the ground devices which were previously described. In the same manner as for FIG. 5, the two components of the magnetic field which are thus obtained are fed into the sampling, numbering and registration circuit 30. The addition at each instant of the two detected signals with opposed polarities allows the effect of the surrounding electrical noises on the useful transient signals to be substantially reduced.

In order to effect the addition of the two signals which are simultaneously detected, after registration, it is of course necessary for this registration to be effected in a synchronous manner, or for the registered signals to be marked temporally.

Tests which we have carried out have shown that these anti-noise devices, in certain cases, allow the level of the measured signal to be increased (it may be doubled in relation to the corresponding devices of the prior art), while allowing a substantial reduction of the noise. In terms of the ratios of signal/noise, the improvement is thus clearly greater than a factor of 2.

Where the anti-noise device of FIG. 5 is particularly concerned, it has been pointed out that the two excitation currents ought to be substantially equal. This is understood to mean that they must have identical waveforms, and must be substantially of the same amplitude at each instant. However, at least in certain cases where the subsoil is close to the tabular structure, it is possible for the amplitudes to be different provided that they are in a constant ratio as a function of time. As a general rule, we have observed that amplitude ratios lower than or equal to 1.2 to preferably 1.1 are acceptable.

Excitation Current

Attention will now be given to the form of the excitation current applied to the transmitter dipole. Since this current contains variations or transitions, any type of excitation current is likely to produce a transient response from the subsoil. An impulsive excitation current designates such a current comprising at least one variation or transition which is referred to herein as a pulse. In fact, as the signals which are received are very weak, they are usually measured while the transmitted current is zero. This explains why the excitation current pulses are followed by time intervals of zero current. In practice, for technological resons, the excitation pulses are generally constituted of a constant current. Thus, excitation pulses are known which are constituted of a constant current interval followed by a time interval of zero current, as is shown by FIGS. 8A and 9A. The form of the signal which is received does not only depend on the structure of the subsoil, but also on the ground device which is being used. Thus, a device of the Schlumberger type (FIG. 1 or FIG. 5) will produce a received signal of the form illustrated by FIG. 8B at the terminals of the receiver dipole.

For such a signal, a pronounced voltage peak is detected by the receiver dipole both at the start of the interval during which the transmitted signal has the value of $+I_o$ and at the end of this interval. However, a ground device such as the one in FIG. 2 produces a different response, such as that of FIG. 9B where there is no detected voltage peak either at the start or at the end of the above mentioned interval.

Careful examination of FIGS. 8B and 9B shows that from instant $t_o$, i.e. during the time interval where the excitation current is zero, the transient signal is the subject of considerable variations during a relatively short time, indicated by $\Delta t$, after which it moves very rapidly towards zero. It is also to be noted that the detected voltages after the interval of excitation current are to the order of a microvolt for an intensity $I_o$ of the order of one amp.

According to the present invention, the excitation current is repeated many times, i.e. many hundred times, preferably between 200 and 300 times. According to the embodiment of FIG. 10A, an excitation current cycle initially comprises an interval of constant current to equal to $+I_o$, followed by a time interval of zero current, then followed by another interval of constant current equal to $-I_o$, in turn followed by another time interval of zero current. The time intervals of zero current are of at least the same duration as a predetermined period of time $\Delta t$. Likewise, the time intervals assigned to the positive and negative intervals are preferably equal to each other and are of a duration close to that of the time intervals of zero current which separates them. In the embodiment shown in FIG. 10A, the four elementary time intervals of the cycle are all equal to each other and to $\Delta t$.

FIG. 10B illustrates the variation of the detected signal $\Delta V$ at the terminals of a receiver dipole of the type shown in FIG. 1 for the excitation current shown in FIG. 10A. The signal of FIG. 10B is disturbed by various noises. Noises of low frequency, generally noises from the ground, correspond to the variation of the average level of the detected signal. Industrial noises, which are generally of a higher frequency are present in the different parts of the detected signal.

Although an excitation signal may be used which is repeated periodically, such as in a series of 200 or 300 cycles as is shown by FIG. 10A, it has proved to be preferable for the repetition of the excitation current to be random, i.e. the instants of the start of the cycle are defined without any periodicity. While, in the signal of FIG. 10A there is no clear limit between consecutive cycles, with a signal of random repetition, the different cycles 110, 111, 112 and so on (FIG. 11) may be easily distinguished.

FIG. 12 shows a more advantageous embodiment of a signal of random repetition, where the repeated cycle comprises triplets of alternate pulses. Only two triplets 125 and 126 are shown for one cycle though in practice, the number may be considerably greater. Although random repetition is advantageous in itself, as regards noise, it becomes even more so when the excitation current is defined by triplets. It will be noted that in a same cycle, the positive and negative intervals as well as the periods of zero current preferably lasts for the same length of time $\Delta t$. On the other hand, in the signal of random repetition, the starts of the cycle vary considerably.

In the previous description, the excitation pulses are constituted by simple intervals of constant current. We have observed that a new pulse form is more advantageous. This form is illustrated in FIGS. 13 and 14 which show two different embodiments on an expanded time scale.

FIG. 13 shows two excitation cycles 130 and 131, comparable to those of FIG. 11. FIG. 14 shows a single cycle of two triplets 135 and 136, comparable to those of FIG. 12.

In these embodiments, each pulse comprises two intervals of current of opposed polarity (133 and 134 or 137 and 138), which are substantially adjacent to each other and are of short duration in respect of the time of zero current which follows (the pulse is of a maximum of a few tenths of a second, preferably at the most equal to one tenth of a second). The two adjacent intervals may be of a different amplitude (FIG. 13), or of the same amplitude (FIG. 14), provided that their linear average is zero, i.e. that the area of the positive interval (between the current curve as a function of time and the axis of zero current is equal to the area of the negative interval. The two adjacent elements of opposed polarity may naturally differ from the form of pure intervals, provided that this condition of zero average is substantially respected.

FIGS. 13 and 14 respectively show one or some cycles of excitation current of two pulses and of two pulse triplets of the form defined above. It may be seen that the different pulses have the same form, but each time with a reversed polarity.

We have observed that this particular form of pulse gives rise to a weaker response from a sterile subsoil which allows the presence of an additional transient response of an anomaly or inclusion to be observed more easily.

Detected Transient Signals

Attention will now be given to the detection of the transient signal by the receiver dipole. As a general rule, the prior art methods recommend measuring a value or a few values of the transient signal which is present after applying the interval of excitation current. In contrast thereto, according to the present invention, time intervals respectively following to the excitation pulses and simultaneous with the zero current of the excitation are defined. These time intervals are of a predetermined duration which is chosen to substantially cover all the useful part of the transient phenomenon. It is observed that the transient phenomenon moves rapidly towards zero, so that the useful part limited by the fact that the level of the transient signal rapidly becomes much lower than the noise level. The invention provides for the detection of the transient signal as a function of time at least during each of the time intervals which are thus defined. $\Delta t$ will be designated in the following as the predetermined duration of the time intervals during which detection is carried out.

According to the invention, sampling, numbering and the temporally marked registration of the detected signal is commenced at least during the predetermined time intervals of duration $\Delta t$. In practice, these operations are effected in a continuous manner on the detected signal $\Delta V$, as well as for the excitation current I. The duration $\Delta t$ of the time intervals is chosen to be between approximately one and twenty seconds, having regard to the characteristics of the transmission current. The sampling step is preferably between two and fifty milliseconds. It has been established that it is important for the numerical registration to be precise. For this, purpose, registration of 11 bits plus the sign is presently considered as satisfactory.

The numerical registration which is thus obtained may then be processed in a computer. The invention makes use of a preliminary processing which may be effected on the ground or just before processing in the computer.

Preliminary processing

This preliminary processing initially comprises the accumulation of samples which correspond temporally in the time intervals of a predetermined duration which are defined above. In other words, an unprocessed numerical representation of the transient phenomenon is worked out as a function of time, and evaluated statistically from the elements of the numerical registration which correspond temporally in the successive time intervals.

The unprocessed representation may be worked out by a simple average, but more sophisticated statistical methods are preferably used involving estimation of the probable value of the measurement from the total of the received samples, while rejecting the registration portions which are too disturbed.

The curve of FIG. 15 shows the variation of this unprocessed numerical representation over the time interval $\Delta t$. The vertical lines serve as a reminder that this curve is constituted, in a discontinuous manner, from a large number of numerical samples.

In order to work out an unprocessed numerical representation of this type, the following method is preferably used. The intervals of duration $\Delta t$, consecutive to each of the excitation pulses, are located in the detected signal either from its own transitions, or, preferably, from those of the excitation current. The numerical signals contained in each of these time intervals are shifted or resynchronised such that the signals of all successive time intervals are caused to coincide in a single time interval of duration $\Delta t$. Simple averaging or a more sophisticated statistical treatment is effected, as defined above, at each instant of the single time interval. In practice, the difference D between two values $V_{1+}$ and $V_{1-}$ which are obtained at the same instant $t_1$ is calculated from two adjacent transient signals (FIG. 10B).

In the case of triplets, two differences are calculated. One difference, $D_1$ is taken between the first and the second pulse and the other difference $D_2$, is taken between the second and third pulse. The differences $\delta = D_1 - D_2$ is then calculated. The process is then restarted with the third, fourth, and fifth pulses.

In both cases, the overall average of the differences D or $\delta$ which are thus obtained is then calculated bearing in mind the polarity of the excitation current.

This produces the unprocessed numerical representation, constituted of a plurality of numerical samples distributed from instant zero to instant Δt, as is shown by FIG. 15.

It is possible, particularly in the case of the transmission current of random repetition, that after the temporal resynchronization of the numerical signals, the numerical samples are not brought back strictly to the same instant. In such a case, the accumulation is effected, a simple average or a more sophisticated statistical treatment is applied, from the numerical samples which approximately correspond to the same instant at one or a few steps of close sampling.

The following stage of preliminary processing is a smoothing numerical filtering which provides a smoothed numerical representation of the transient phenomenon, cleared of a substantial part of the surrounding noises.

This numerical filtering may comprise one or more of the following operations:

(a) Low-pass, or band pass numerical filtering, to eliminate the frequencies which are essentially due to noise.

(b) Replacement of each numerical sample by the moving value, weighted or unweighted, of all the numerical samples contained in a predetermined number of samples, which surround the sample under consideration. This may be effected on all the numerical samples of the unprocessed representation, or only on certain of them, preferably regularly distributed and chosen to be fairly numerous in order to obtain a sufficient number of points in the smoothed numerical representation.

(c) Determination by a numerical calculation of a number of cubic curves (curves of the third order) which best approach the shape of the curve defined by the unprocessed numerical representation. In this case, the smoothed numerical representation is constituted of values or numerical samples associated with the series of cubic curves.

FIG. 16 simplifies the curve associated with the smoothed numerical representation.

FIG. 17 illustrates smoothing by cubic curves. The time interval 0 to Δt is divided into several smaller intervals defined by the instants $t'_1$, $t'_2$, $t'_3$ and $t'_4$. A cubic curve approximating the unprocessed curve is investigated for each of these intervals, it being required that there should be continuity of the first and second derivatives at each interval limit. Other conditions may be imposed, such as requiring that the sum of the squares of the differences between the cubic curves and the unprocessed curve are the interval 0 to Δt should be a minimum.

Generally, the smoothing stage is followed by a standardization of the smoothed numerical representation. This standarization may consist in evaluating the ratio of the transient signal (according to the smoothed numerical representation) to the excitation current (particularly in the case where each excitation pulse is defined by one or more intervals of constant current). It may also consist in evaluating the ratio of the transient signal to the continuous voltage of steady state which it contains (Vcc; FIG. 8B). In the present invention it is preferred that one or more of the following standardizations should be effected (which ought to be taken in order, if appropriate):

(a) Calculation of a mathematical operator by consideration of the transmission through the effectively used transmission path if a predetermined signal (for example the Dirac delta function), then convolution of the smoothed numerical representation by this operator;

(b) Calculation of a theoretical curve representing the transient electromagnetic field which would produce the transmission current which is effectively used for a simplified subsoil, for example in tabular form, and substraction of this theoretical curve from the curve defined by the smoothed numerical representation;

(c) Calculation of the total area of the curve defined by the smoothed numerical representation, then replacement of each point of the curve by the ratio of the partial area of a predetermined "window" including this point to the total area.

After standardization, a smoothed and standardized numerical representation is obtained, with which a new curve is associated which will be called a preprocessed curve, in contrast to the unprocessed curve directly resulting from the unprocessed numerical representation.

In its general course, the preprocessed curve is only slightly different in principle from the smoothed curves (for example FIG. 16) and is therefore not separately illustrated here.

In basic terms, the product of preliminary processing comprises:

(a) A digital file containing all the parameters of the measuring station (position coordinates, measuring conditions, etc.) and all the results of preliminary processing, even intermediates;

(b) A list of the principal results and parameters;

(c) A drawing of the preprocessed curve and the unprocessed curve of the station.

This is naturally repeated for each of the measuring stations.

Attention will now be paid to the processing which allows the preprocessing product to be transformed onto the figurative representation intended for the geophysicist.

Although different processes may be used, we preferably use two types of processing. The first type individually involves the data relating to each of the measuring stations. An approximation is effected by exponentials of the curve defined by the smoothed and standardized numerical representation, the exponentials being in the form of $a \cdot e^{-t/\tau}$, where a is a coefficient, $\tau$ is a time constant and t is the time variable. The second type, which may be associated with the first type, also involves the determination of a regional curve from an assembly of local curves obtained from a number of measuring stations. The initial local curves (of processing) are then transformed into residual local curves by subtracting from them the regional curve. This is therefore called collective processing.

Individual Processing

We have observed that the transient phenomenon may be represented (if not explained) by a process dependent on time constants which are themselves a function of the electromagnetic parameters of the subsoil. These time constants are either investigated for each temporal point of the representation of the transient phenomenon, or for all the curve illustrating the transient phenomenon as a function of time.

Each of the temporal points of the numerical representation of the transient phenomenon will be noted $V_i$, the index i varying with the time.

In the first case, for each temporal point $V_i$, the adjacent points on both sides are also considered, that is at least $V_{i-1}$ and $V_{i+1}$. An exponential of the form $a_i \cdot \exp(-t/\tau_i)$ is investigated which passes closest to all the considered points. Thus, with each point $V_i$, a time constant $\tau_i$ and a coefficient $a_i$ are associated which define a tangential (or better, osculating) exponential to the transient curve at this point. Therefore, the time constant $\tau_i$ or the coefficient $a_i$ may be used for the figurative representation in the form of a time section, or even expressions related to these magnitudes (for example $a_i \cdot \tau_i/a_o$, or $a_o$ represents the coefficient of the exponential associated with the initial instant).

In the second case, a finite number of exponentials is investigated whose sum approaches the numerical representation V:

$$V(t) = \sum_{K=1}^{P} a_k \cdot \exp(-t/\tau_k).$$

The coefficients $a_k$ and $\tau_k$ are determined by a method of least squares, either for each local curve, individually, or for all the local curves. The criterion of least squares may be applied only on one side between the preprocessed local curve and its approximation by exponentials. Additional terms relating to the coefficients $a_{kj}$ and to the time constants $t_{kj}$ are preferably added thereto where the index k corresponds to an exponential for a given measuring station, while the index i involves different measuring stations. Thus, a set of values $a'_k$ and $\tau'_k$ are defined separately, which are considered acceptable by the geophysicist bearing in mind the problem which is posed and the results from all the measuring stations. The additional terms of the criterion of least squares thus involves, with appropriate coefficients, expressions of the form $$\sum_K (a_{kj} - a'_k)^2 \text{ and } \sum_K (\tau_{kj} - \tau'_k)^2$$

A figurative representation may then be produced in the form of a chart with contours or variable density. The represented parameter is thus one of the time constants $\tau_{kj}$ which are retained with an indication of its coefficient $a_{kj}$, or a combination of coefficients and/or time constants.

Collective Processing

As has been previously indicated, a regional curve is determined from a collection of local curves. Several cases may be distinguished. If the starting point is a number of aligned measuring stations, the regional curve may be established as a function of time, for example, in the form of a simple average of the local temporal curves. If the starting point are stations divided over a two-dimensional zone, the regional curve is thus established spatially, at a predefined constant time (after having thus fixed the time, local spatial curves may be defined which correspond to an alignment of stations).

Various methods to defined the "regional" effect are known in other spheres of geophysics. According to the invention the following methods are preferred at present.

According to the first method, a two-dimensional contour is defined, preferably a circle or ellipse around each point, which gives a standard zone of chosen dimension. The area of the second degree closest to the points inside this contour are thus investigated.

It will be admitted, for example, that a collection of defined points are available at a constant time, for a number of stations given on a region of two dimensions x and y. In this region, a contour, for example circular or ellipse, is traced. All the points contained within this contour are numbered by an index i, while marking as Vi the transient response of the point at the considered instant.

An area of the second degree, defined by its parameters a,b,c,d,e,f is thus searched, and such that the following expression is a minimum:

$$\sum_i \lambda_i^2 [(a \cdot x_i^2 + 2b \cdot x_i \cdot y_i + c \cdot y_i^2 + dx_i + ey_i + f) - V_i]^2$$

where $\lambda_i$ denotes a weighting coefficient which depends on the position of point i in the ellipse.

If necessary, this operation is repeated with another identical contour which covers a different part of the two-dimensional region. Continuity conditions may naturally also be provided to the limits between the different areas of the second degree which are thus defined.

The collection of the areas of the second degree which are obtained defines the regional response from the collection of the observation region.

Local residual values are therefore determined by subtracting from each local value (such as $V_i$), the value given at the same point considered as a regional response.

The above example relates to a regional curve defined at a constant time for two spatial coordinates x and y. A similar processing for measuring stations which are substantially aligned may naturally be effected, this time with a single spacial coordinate x, and the time variable t.

However, in order to determine a regional response as a function of time from the aligned stations, another process, which is simpler is presently considered preferable.

In this case, the starting point is the smoothed numerical representation which is standardised in relation to areas (the last of the standardizations given above). This numerical representation depends on the time t, as well as on the spatial coordinate x, and is designated V (x,t). The simple average of the values of V for x variable and t constant is thus determined, which gives the regional response $V_R$:

$$V_R(t) = \frac{1}{N_x} \sum_x V(x, t)$$

where $N_\chi$ represents the number of values of $\chi$ from which the average is calculated.

The local residual values are then obtained by subtracting the regional response from each local value, at each instant. By designating the local residual values $V_r$ (x,t), the following is produced:

$$V_r(x,t) = V(x,t) - V_R(t)$$

By whatever method the local residual values have been obtained, these values are then the sbject of a figurative representation intended for the geophysicist. This representation is a time section if the local residual values are a function of time and a space variable. It will be a chart if the local residual values are defined at constant time, as a function of two space variables.

By way of illustration, an example of a figurative representation is given. FIG. 18 is a table which comprises as a function of time (ordinate) the residual values relating to six aligned stations along an axis, that is "section B". FIG. 19 is a figurative representation of variable density produced from the data of FIG. 19, still with time as the ordinate, and with distance as abscissa. The shades are scaled as follows from white to black: $-34, -31, -21, -14, -9, -5, -2, 0, 5, 9, 13, 17, 22, 27, 32$, and $37$).

Figure 20:
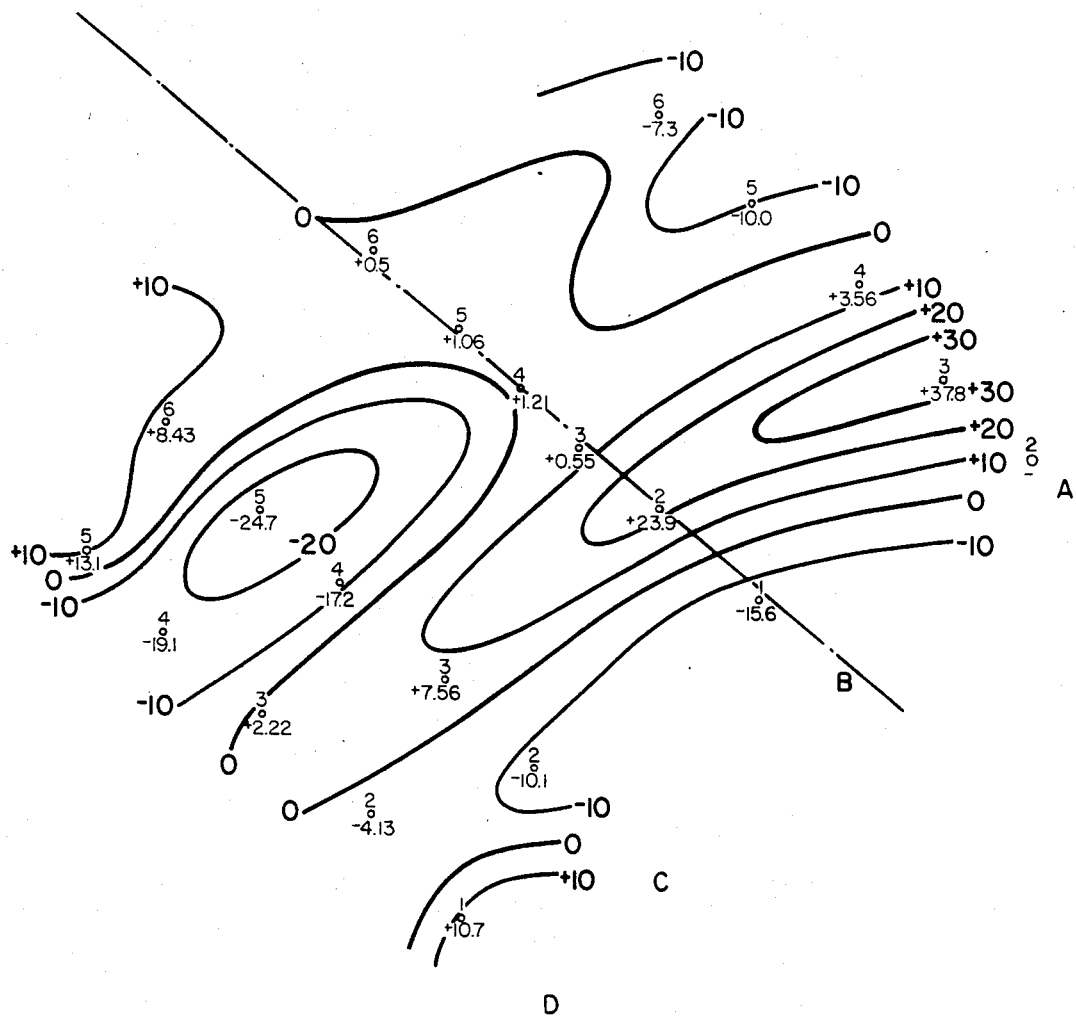
FIG. 20 is a figurative representation in the form of a chart, in contours, produced from four sections A, B, C, D, including the one of FIGS. 18 and 19.

FIG. 20 is a 2-dimensional chart, in contours, with grey tint for the positive values, where along the axis in a mixed feature line, section B may be seen which is the subject of FIGS. 18 and 19 (for the time 3.25 sec; specifically a window which ranges from 2.80 to 3.64 sec. from which the average is calculated.

Therefore, the geophysicist finally receives figurative representations of the type of those in FIGS. 19 and 20, in order to detect from them the responses likely to correspond to deep anomalies, such as oil-bearing layers.

Experiments have already been carried out on ground already known from drilling. (The method according to the invention is preferably implemented on ground of which the general structure is known from seismic exploration, but not necessarily from drilling). A good correlation has been obtained between the strong anomalies of positive residual values and oil deposits which have already been located. It is believed that this favourable result depends on the care attached to the suppression of noise, according to the present invention.

Preferred Embodiment of the Invention

The initial steps of the preferred embodiment are the same as described above, up to the generation of the smoothed numerical representation SNR of FIG. 17.

For the smoothing step, a filtering by the cubic functions is used for example, using the time intervals defined by $t'1, t'2, t'3$, and $t'4$ (FIG. 17).

As previously, it is advantageous to then proceed to a standardization of the curve or smoothed numerical representation.

The standardizations which were previously described may be used. We consider at present that it is useful, in order to facilitate the later processing, to give the smoothed curve a variation of monotonic form, this curve being characterised by the fact that all its values are positive.

For this, it is possible, knowing a simplified model of the subsoil, in tabular form, i.e., in parallel layer, to numerically determine the transient response of this simplified subsoil model according to the excitation current which is effectively used. Illustrated by TC (theoretical curve) in FIG. 21, this theoretical transient response of the simplified subsoil model is brought back to the same scale as the smoothed numerical representation SNR, in a known manner (for example by using the response at the current interval Io).

The difference between the curves SNR and TC gives a smoothed numerical representation of monotonic form, SNRM (FIG. 22), which is used as a basis for the processing itself.

For this purpose an approximation by exponentials at different points of the curve SNRM of FIG. 22 is produced. That is to say, that a curve of the form $$a_i \exp\left(-\frac{t}{\tau_i}\right)$$

is investigated which best passes through the point or considered numerical sample on the layer SNRM as well as through n numerical samples upwards, and preferably the same number of numerical samples downwards. Generally, $1 \leq n \leq 5$, and, in practice, n is often taken to be equal to 2.

The exponential curve which is thus defined naturally has the same gradient as the curve SNRM at the considered point.

Therefore the time constant $\tau_i$ is advantageously associated with the point concerned, which, as will be noted is connected to the logarithmic derivative of the above exponential function (and consequently of the curve SNRM at the same point), a logarithmic derivative of which it is the reciprocal with a change in sign.

In practice, it is also possible to directly calculate in numerical manner the logarithmic derivative with respect to time of the sample points defining the curve SNRM by still using n points on both sides.

In a more general manner, it is possible to calculate a simple derivative, still with n points on both sides, or even to numerically determine in another manner the variations of the gradient of the curve SNRM as a function of time, or the variations of the ratio of gradient to amplitude.

Figure 23:
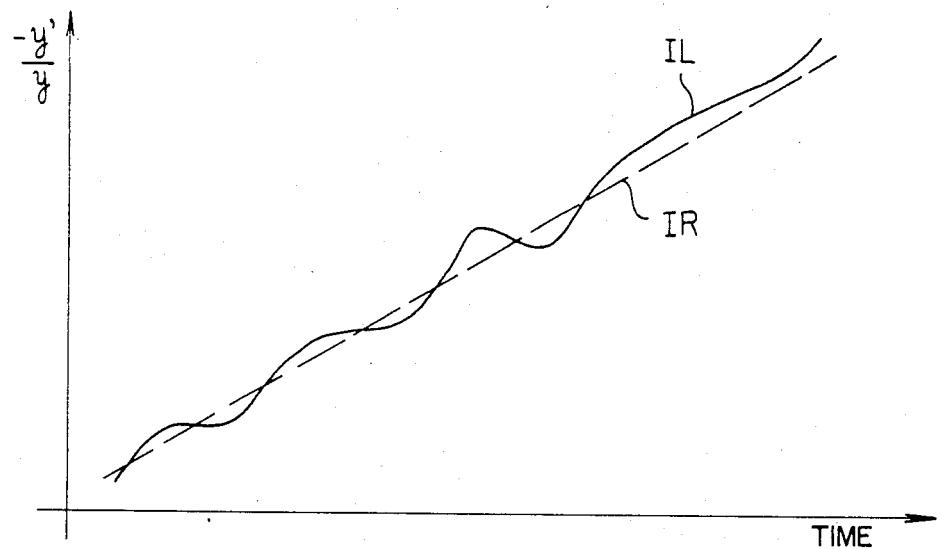

FIG. 23 shows for example, in a full line, the reciprocal of the logarithmic derivative (change in sign) of the curve SNRM of FIG. 22. (The case of the reciprocal of the logarithmic derivative will be used in the following).

The method described above is naturally implemented for each of several prospection stations. For each of these, a curve of the form shown in a full line in FIG. 23 is obtained. This curve, or rather its numerical representation, defines a local indicator function (LI) for each station.

When considering the local indicators of a group of stations, according to the present invention, a regional indictor associated with this group of stations is defined, which represents the "common mode" of their local indicators. In order to obtain the "common mode", the average of the local indicators which are considered may simply be evaluated.

In this manner, it has been observed that, for the logarithmic derivatives, the logarithm of the regional indicator may substantially be a parabolar (function defined by a polynomial of the second degree in time). Therefore, the "common mode" can be investigated in the form of the best function of approximations of the local indicators by a function of the second degree in time. The "common mode" regional indicator may, for example, have the form shown by the broken line RI in FIG. 23.

This common mode may be considered as a regional transient response of the form:

$$A \cdot \exp(a \cdot t^2 + b \cdot t + c)$$

bearing in mind our observations.

If the local indicators are to defined by simple derivatives or by another function of the variations, the common mode may still be found therefrom, possibly by investigating a regional response which is analogous to that which is to be described.

As indicated previously, the regional response may be taken for all or for part of the prospection stations. In the case where the latter are arranged geographically according to a two-dimensional network, it is possible, as described above, to investigate the geometrical areas of the second degree (along the spatial coordinates x,y) which best approach the local curves on the current zones of selected dimensions.

Figure 24:
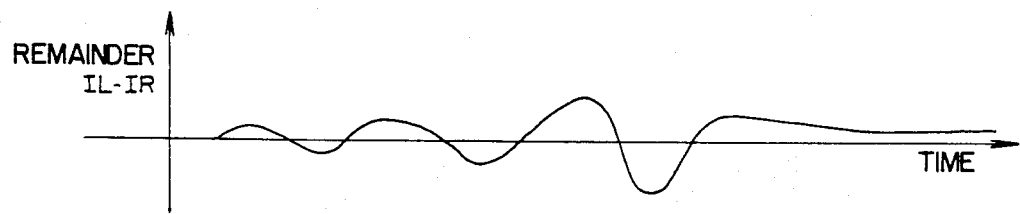
FIG. 24 shows the form of a residual indicator obtained from a difference from the curves of FIG. 23 and used as a basis for the figurative representation according to the preferred embodiment of the invention.

Whatever the definition of the local and regional indicators, the following operation consists in evaluating the difference between each local indicator and regional indicator, which each time gives a remainder, an example of which is shown in FIG. 24.

For example, by taking a number of aligned prospection stations, it is possible to make a representation of the remainders where the alscissa corresponds to the stations, distributed along their distance, and the ordinate corresponds to the time variable of the transient phenomenon. Contour curves or points of variable density as a function of the remainders obtained according to the present invention are thus entered on this graph, that is, time section.

It is established that the figure which is thus obtained resembles a subsoil structure to the geophysicist.

Experiments have been carried out in pieces of ground for which time sections were available which had been obtained by geophysical prospection of the seismic reflection type. Measurements were also taken according to the present invention, using the ground device of FIG. 1 (AB=1500 m; MN=500 m approximately) and a form of excitation wave according to FIG. 10A. These measurements were found to have a low noise level (notably noises from the ground).

After numerical registration, a preprocessing was carried out with statistical recombination of the transient response at each station from the elementary measuring signals, then smoothing by digital filtering to produce the moving average value for an integration window of constant size, and then a standardization in relation to the theoretical transient response associated with the simplified tabular structure associated with the time section obtained in seismic reflection (hence a numerical representation of the SNRM type, described above).

Processing was carried out from these representations or curves SNRM, of which the logarithmic derivative was taken to obtain the local indicators associated with different stations. A regional indicator was then investigated, best approaching the collection of the local indicators of the form:

$$A \cdot \exp(at^2 + bt + c)$$

The residual indicators were finally determined from the difference between the local indicators and the regional indicator.

A figurative representation in a time section is thus produced, and this is then compared with the time section produced by seismic reflection. In both cases, the same long lines of the structure of the subsoil were found with the faults and other dip reliefs.

The scale of distances of the time sections was naturally the same in both cases. However, we have observed that improved correspondence between the transient and seismic representations were obtained by using an arithmetic time scale for the seismic and a square root time scale for the transient.

The low noise level of the measurements is considered as an important factor in ensuring that the final figurative representation shows the structure. In this respect, noise reduction means are advantageously used which were described above, namely:

(a) Specific ground devices such as a double Schlumberger device, a symmetrical perpendicular dipole-dipole or a symmetrical magnetic dipole-dipole;

(b) Particular forms of the excitation current, notably a random distribution with time, and/or pulse triplets and/or two interval pulses which are very close and are of alternate polarity;

(c) Statistical composition and a quality smoothing digital filtering, possibly by trying several different filterings.

Apart from the standardization effected by consideration of the theoretical response of a simplified subsoil model, it is possible to use one or more of the other standardizations indicated above.

For processing according to the preferred embodiment, the regional indicator may be investigated for a limited region containing only one part of the prospection stations. Although the nature of the "regional" is not the same here as in the previous embodiments, the determination means of a regional which are described there or which are known from elsewhere may still be applied to the preferred embodiment.

All the embodiments which were previously described in this specification may generally be used for the preferred embodiment.

Moreover, although a time section only has one space coordinate, processing according to the present invention may be effected from two space coordinates and one time coordinate. The regional indicator is determined from all or part of the stations. One residual indicator per station is finally obtained. From this, it is possible to construct time sections for aligned or nearly aligned stations. On a chart of the geographical arrangement of the stations, a value of the transient phenomenon may also be revealed, for example, amplitude of the residual indicator for a given value of the time (instantaneous or weighted value).

The invention is naturally not restricted to the embodiments which have been described, and embraces any variation which conforms to its spirit. In particular, it is possible to choose from among the different variations which are suggested having regard to the interest of the geophysicist in the final figurative representation which follows therefrom.

We claim:

1. A method of geophysical prospecting to obtain a figurative representation for geophysical interpretation, comprising:

(a) positioning a first transmitter dipole and a first receiver dipole in cooperation with subsoil;

(b) supplying an impulsive excitation current to said first transmitter dipole, said current comprising a group of excitation pulses of alternate polarity, each followed by a zero current;

(c) detecting transient signals, produced at the output of said first receiver dipole;

(d) defining predetermined time intervals consecutive to said excitation pulses and simultaneous to said zero current and which include substantially all useful parts of said transient phenomenon, wherein said detecting occurs as a function of time, at least during said time intervals;

(e) preprocessing said signals including sampling, digitalizing, recording and temporally marking said signals during said time interval to produce digitally recorded samples which correspond temporarily to said time intervals;

(f) processing said digitally recorded samples, wherein said step of processing comprises:
  (i) statistically evaluating said digitally recorded samples of said transient phenomenons as a function of time;
  (ii) after said evaluating step, smoothing said digitally recorded samples by digital filtering to produce a smoother digital representation of said transient phenomenon free of a substantial portion of surrounding noise.

2. The method of geophysical prospecting according to claim 1, wherein said excitation current is repeated many times, the excitation current and the detected signals being continuously recorded in digital form, said predetermined time intervals being between approximately 1 and 20 seconds, and the sampling step having a duration of between approximately 2 and 50 milliseconds.

3. The method of geophysical prospecting according to claim 2, wherein the excitation current is repeated in a random manner.

4. The method of geophysical prospecting according to claim 1, wherein the excitation current comprises at least one triplet of pulses of alternate polarity.

5. The method of geophysical prospecting according to claim 1, wherein within each group of pulses a first excitation pulse comprises two intervals of current of opposed polarity, substantially adjacent to each other, of overall zero energy, and of brief duration compared to a following time interval, and following pulses having the same form but of reversed polarity.

6. The method of geophysical prospecting according to claim 1, wherein said transmitter dipole comprises an electrical dipole defining a transmission axis, and said receiver dipole comprises an electrical dipole positioned on a reception axis parallel to the transmission axis, the receiver dipole being next to and shorter than the transmitter dipole, the method further comprising the steps of:
  (a) positioning a second electrical transmitter dipole of substantially the same length as the first transmitter dipole on the transmission axis, substantially adjacent to the first transmitter dipole, the two transmitter dipoles being generally symmetrical to each other in relation to an axis perpendicular to the transmission axis;
  (b) wherein the step of supplying further includes applying excitation currents of substantially equal magnitude and opposed polarity simultaneously to the two transmitter dipoles;
  (c) positioning a second electrical receiver dipole, generally symmetrical to the first receiver dipole in relation to the said axis of symmetry on the reception axis; and
  (d) wherein the step of detecting further including generally simultaneously detecting the signals appearing at the terminals of the two receiver dipoles wherein, the addition at each instant of two detected signals with opposed polarities allows the effect of the surrounding electrical noises on the useful transient signals to be substantially reduced.

7. The method of geophysical prospecting according to claim 6, including the step of positioning at least one magnetic dipole next to each of the electrical receiver dipoles and arranged generally symmetrically in relation to said axis of symmetry.

8. The method of geophysical prospecting according to claim 1, in which the first transmitter dipole comprises an electrical dipole and the first receiver dipole comprises a shorter electrical dipole having an axis perpendicular to an axis of the first transmitter dipole, said axes having an intersection positioned next to an end of the first transmitter dipole, the method further comprising positioning a second electrical receiver dipole generally symmetrically to the first receiver dipole in relation to the axis of the first transmitter dipole wherein the signals appearing at the terminals of the two receiver dipoles are simultaneously detected, wherein the addition of each instant of two detected signals having opposed polarities substantially reduces the effect of surrounding electrical noise on the useful transient signals.

9. The method of geophysical prospecting according to claim 1, wherein said first transmitter dipole comprises an electrical dipole having an axis and said first receiver dipole comprises a magnetic dipole positioned next to said first transmitter dipole and between its ends, the method further comprising positioning a second magnetic dipole, generally symmetrical to the first magnetic dipole in relation to said axis whereby signals appearing at the terminals of the two magnetic dipoles are simultaneously detected, the addition at each instant of two detected signals having opposed polarities substantially reducing the effect of surrounding electrical noise on useful transient signals.

10. The method of geophysical prospecting according to claim 1, wherein the smoothing step is followed by a standardizing step which produces a smoothed and standardized digital representation.

11. The method of geophysical prospecting according to claim 10, wherein the standardizing comprises generating a mathematical operator representing the passage of a current of a predetermined type, and convoluting the smoothed numerical representation by said operator.

12. The method of geophysical prospecting according to claim 10, wherein the standardizing step comprises calculating a theoretical curve representing the transient electromagnetic field which would produce a transmission current for a simplified subsoil model, and subtracting a representation of said curve from the smoothed digital representation.

13. The method of geophysical prospecting according to claim 10, wherein the standardizing step comprises calculating the total area of a curve defined by the smoothed digital representation, and determining at each point of said curve a new value equal to a ratio of a partial area of a predetermined window surrounding said point, to the total area.

14. The method of geophysical prospecting according to claim 10, wherein said processing further comprises approximating, by exponentials, a curve defined by the smoothed and standardized digital representation, the exponentials being of a form $a \cdot e - t/\tau$, where $a$ is a coefficient, $\tau$ a time constant and $t$ the time variable.

ing to claim 14, wherein said approximating by exponentials comprises determining a linear combination of several exponentials of different time constants approaching the said curve.

16. The method of geophysical prospecting according to claim 14, wherein approximating by exponentials comprises, determining, at various points of the said curve, an exponential which best approaches said curve near each of said points.

17. The method of geophysical prospecting according to claim 14, wherein the figurative representation for geophysical interpretation involves at least one parameter of the exponentials chosen from among the coefficient a and the time constant $\tau$.

18. The method of geophysical prospecting according to claim 10, wherein each step is repeated when successively implanting the transmitter-receiver dipoles at different stations of a zone to be prospected, thereby producing a plurality of smoothed and standardized local digital representations, and defining local curves respectively associated with the different stations, wherein said processing further comprises digitally establishing a regional curve, from the local curves, and determining a plurality of residual digital representations from the difference between the local curves and the regional curve.

19. The method of geophysical prospecting according to claim 18, wherein the regional curve is established as a function of time for a plurality of stations which are substantially aligned.

20. The method of geophysical prospecting according to claim 18, wherein the regional curve is established spatially, at constant time, for a plurality of stations distributed over a two-dimensional zone.

21. The method of geophysical prospecting according to claim 18, wherein said step of digitally establishing the regional curve further comprises investigating geometrical areas of second degree, approaching the local curves on standard zones of chosen dimensions.

22. The method of geophysical prospecting according to claim 18, wherein said step of digitally establishing the regional curve further comprises calculating simple averages from corresponding points in different local curves.

23. The method of geophysical prospecting according to claim 18, wherein the figurative representation for geophysical interpretation involves at least one digital value of each residual numerical representation.

24. The method of geophysical prospecting according to claim 1, wherein the figurative representation comprises a chart illustrating a digital value at a given instant, of a plurality of prospecting stations distributed over a two-dimensional ground zone.

25. The method of geophysical prospecting according to claim 1, wherein the figurative representation comprises a time section, illustrating, for a plurality of substantially aligned stations, variations as a function of time of a represented parameter.

26. The method of geophysical prospecting according to claim 1, wherein the figurative representation comprises a graphical illustration of points of variable density.

* * * * *